June 22, 1926.
H. BEHNKEN ET AL
1,589,833
MEASURING DEVICE FOR THE EXAMINATION OF ELECTROMAGNETIC WAVES
Filed July 13, 1925
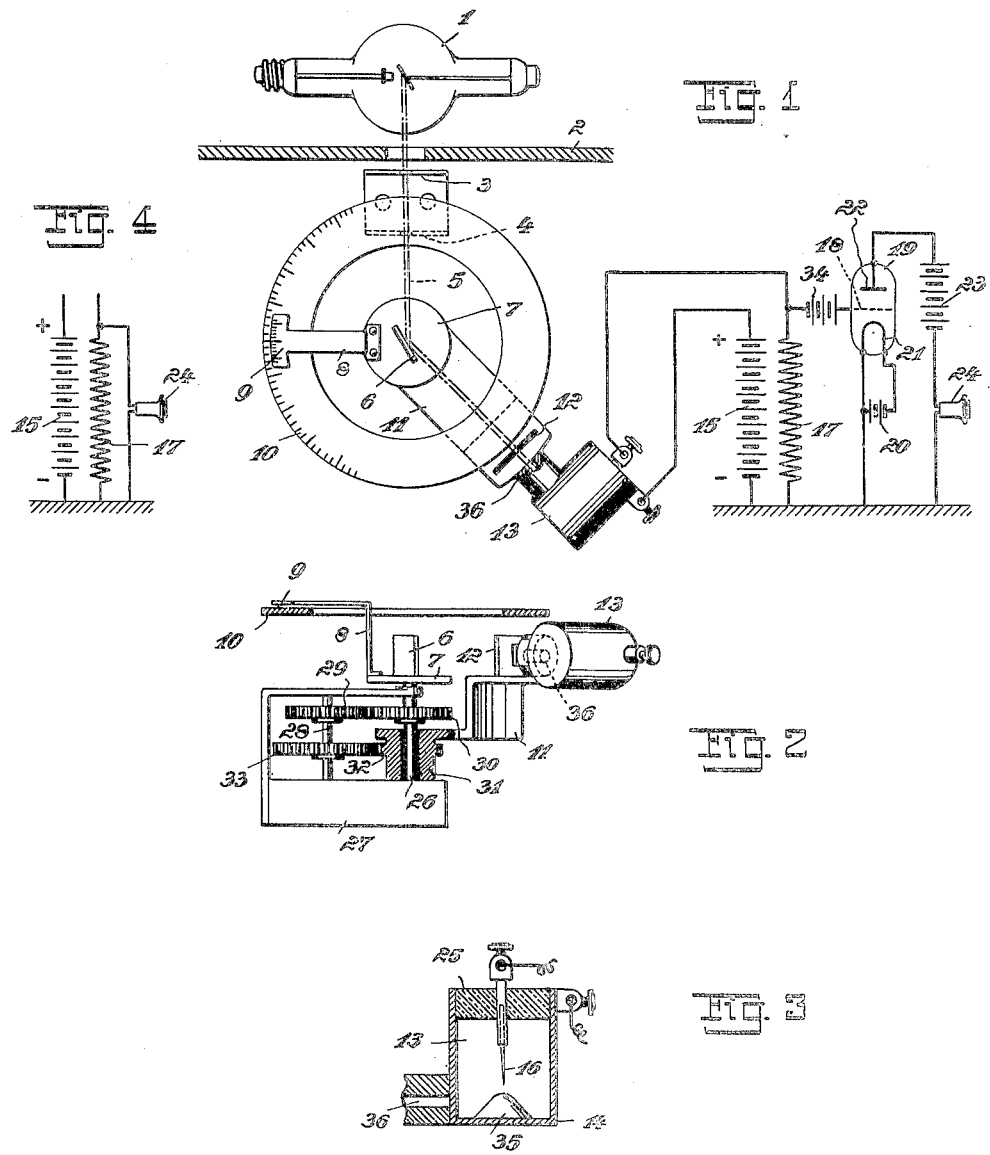
Inventors:
Hermann Behnken
Georg Jarckel
Walter Kutzner
by Lotka, Kellenberg & Farley
Attorneys Patented June 22, 1926.

1,589,833

UNITED STATES PATENT OFFICE.

HERMANN BEHNKEN, OF BERLIN-CHARLOTTENBURG, GEORG JAECKEL, OF BERLIN-LICHTERFELDE, AND WALTER KUTZNER, OF BERLIN, GERMANY.

MEASURING DEVICE FOR THE EXAMINATION OF ELECTROMAGNETIC WAVES.

Application filed July 13, 1925, Serial No. 43,269, and in Germany December 21, 1923.

The present invention relates to improvements in measuring devices for the examination of electromagnetic rays especially the voltage of X-ray tubes and the hardness of the X-ray radiation.

In order to determine precisely the short wave length limit of the X-ray spectrum the spectrograph has been used, whereby the spectral photography was photometered. Such meterings are however rather difficult to perform and require considerable time, because the photographic plate on which the spectrogram is photographed must be exposed for several hours when narrow slits are used at the crystal of the X-ray spectrometer.

According to the present invention the short-wave limit of the X-ray spectrum and the voltage of the X-ray tube during the photographing of the X-ray spectrum are measured directly with an exactness which was hitherto unknown. This is accomplished by means of a $\beta$-particles counting chamber especially equipped with a needle point electrode having no opening and being made of a material which is non-pervious to $\alpha$-rays.

The said chamber is shiftably located opposite to the X-ray spectrometer.

Having found the shortest wave length of the X-ray spectrum, the highest voltage at the X-ray tube during the photographing may be found after the well known Planck-Einstein formula or the formula of Duane-Hunt:

$$V.L = 12.3 \text{ kilovolt Angstroem.}$$

In this formula V is the voltage and L is the shortest wave length to be found. The tube voltage corresponds however, when hot cathode X-ray tubes are used, also with the hardness of the generated radiation, so that both values may be ascertained through the use of the new device.

A constructional form of the invention is shown schematically by way of an example in the attached drawing.

Fig. 1 is a plan view of the X-ray spectrometer with the counting chamber and the electrical connections of the device.

Fig. 2 is a lateral view of the spectrometer.

Fig. 3 is an enlarged sectional view of the counting chamber.

Fig. 4 shows a modified form of the electrical connections as arranged during the measuring.

The X-ray spectrometer is formed after the data given by Bragg. The X-ray tube 1 is arranged in a casing 2 which is lined with lead. Only one wall of the casing is shown in the drawing. From the cone of light radiating from the anti-cathode a narrow beam of light 5 will escape through the narrow slots in the plates 3 and 4 which are arranged on the spectrometer frame. This beam of light will meet the crystal 6, which is supported on a disc 7 which may be rotated round a perpendicular axis. To the disc 7 a pointer 8 is attached, the other end of which is equipped with a vernier 9 which moves over a circular scale 10, fixedly connected to the frame.

The disc 7 is fixed to a shaft or spindle 26, which is rotatably arranged in a casing 27, which casing also contains a clock work. This clock work drives a shaft 28, which however also may be driven by means of an electric motor or a crank. The spindle 28 is coupled to the spindle 26 by means of two gear wheels 29, 30, so that both spindles rotate slowly at the same velocity. A sleeve 31 with an arm 11 is rotatably arranged on the spindle 26. The sleeve also carries a gear 32, which is driven by means of a gear 33 on the clock shaft. The gear ratio is such that the sleeve 31 and the arm 11 rotate with a velocity which is twice as high as the velocity of the disc 7, carrying the crystal. The arm 11 carries a slotted plate 12 and behind this a counting chamber 13 is arranged. The angular velocity of the arm 11 is made twice as high as the velocity of the disc 7, in view of the circumstance that the deviation of the reflected rays is twice the angle of incidence of the radiation.

The construction of the counting chamber is shown in Fig. 3. The same consists of a completely closed cylindrical casing 14, preferably of aluminium, which is connected to the positive pole of a grounded direct current source 15 of a sufficiently high voltage. In this chamber a needle point electrode 16 is arranged which is insulated by means of an amber plug 25 and is grounded through a high resistance 17. An amplifier tube 19 is connected to the counting chamber 13 in the following manner: The grid 18 of the tube is connected to the positive pole of a battery 34 and the negative pole of the battery is connected to the needle point electrode 16. The filament or cathode 21 is connected in series with a second battery 20 of which the positive pole is grounded. The plate or anode 22 is connected to the positive pole of a third battery 23, the negative pole of which is grounded through a telephone receiver 24.

The X-rays pass through the slotted plate 12 into the counting or ionization chamber 13 and strike an electrode 35, of lead or bismuth, which is positioned opposite the point of electrode 16. The electrode 35 is thereby activated, causing it to set up a secondary radiation of gamma-rays which ionize the air or other gas within the chamber and thereby permit a discharge from the point of electrode 16. The resulting current through the circuit is amplified by the tube 19. It is possible to arrange the apparatus in such a manner that a rather great number of electrons are released, probably several in each second, and thereby produce a distinctive sound in the telephone receiver which may be readily detected by the operator.

The reading on scale 10 is taken by means of the vernier. If desired, the scale 10 may be calibrated directly in wave-lengths. From the value read off on the scale the tube voltage or the ray hardness may easily be found.

According to Fig. 3 the counting chamber is arranged in such a manner that a powerful action is created even at a very weak radiation. For this purpose the electrode 35 is placed directly opposite to the needle 16 in the interior of the chamber. By means of a lateral channel 36 in the chamber casing 14, the X-rays passing through the slotted plate 12 are directed against the point of the electrode 35 which is lying next to the needle point. Thereby electrons will be discharged which are hurled off mainly perpendicularly to the direction of the rays, i. e. chiefly in the direction of the needle point.

It is important that the electrode 35 be positioned very close to the point of electrode 16. The chamber is filled with any suitable gas, which may be subjected to any suitable pressure.

In the arrangement shown in Fig. 4 the telephone 24 is connected directly across the resistance 17 without employing any amplifier. The resistance and also the battery are connected to the counting chamber 13 in exactly the same manner as shown in Fig. 1.

What we claim as our invention and desire to secure by Letters Patent is:—

1. A discharge counting chamber for measuring devices for the analysis of electromagnetic waves, especially X-rays, comprising a casing, a highly insulated needle point in the said casing, a body arranged directly opposite to the said needle point and a channel for the admission of the rays into the chamber, said channel being located in the said casing wall in such a manner that the rays will hit the said body and discharge the loaded particles.

2. A discharge counting chamber for measuring devices for the analysis of electromagnetic waves, especially X-rays, comprising a casing, a highly insulated needle point in the said casing, a body arranged directly opposite to the said needle point and a channel for the admission of the rays into the said chamber, and arranged in the wall of the casing perpendicularly to the axis of the said needle point in such a manner that the rays will hit the said body and discharge the loaded particles.

3. A discharge counting chamber for measuring devices for the analysis of electromagnetic waves especially X-ray waves, comprising a cylindrical casing, a highly insulated needle point arranged axially in the said casing, a body located axially to the said needle point and directed towards the same and a channel arranged in the wall of the casing perpendicularly to the axis of the said needle point in such a manner that the rays will hit the said body and discharge the loaded particles.

4. An ionization chamber for the analysis of X-rays, comprising a casing, a pointed electrode extending within said casing and insulated therefrom, means for admitting a beam of X-rays to the interior of said casing, and a second electrode disposed within said casing in the path of said beam and adapted to be activated by said beam.

5. An ionization chamber for the analysis of X-rays, comprising a closed casing, a pointed electrode extending within said casing and insulated therefrom, means for admitting a beam of X-rays to the interior of said casing, and a lead electrode within said casing in the path of said beam of X-rays.

6. A device of the class described, comprising a closed casing, gas in said casing, an electrode having a point disposed within said casing, means for admitting a beam of X-rays to the interior of said casing, and a second electrode within the said casing and spaced from said point to form a gap, said second electrode being disposed in the path of said beam of X-rays and adapted to be activated thereby to ionize said gas.

In testimony whereof we affix our signatures.

HERMANN BEHNKEN.
GEORG JAECKEL.
WALTER KUTZNER.